J. BECKER.
FEED REVERSING DEVICE.
APPLICATION FILED APR. 21, 1910.
1,199,337.
Patented Sept. 26, 1916.
2 SHEETS—SHEET 1.
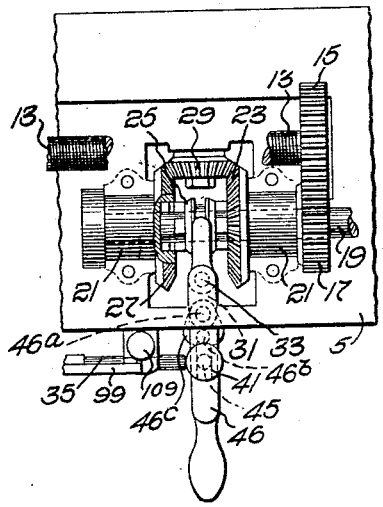
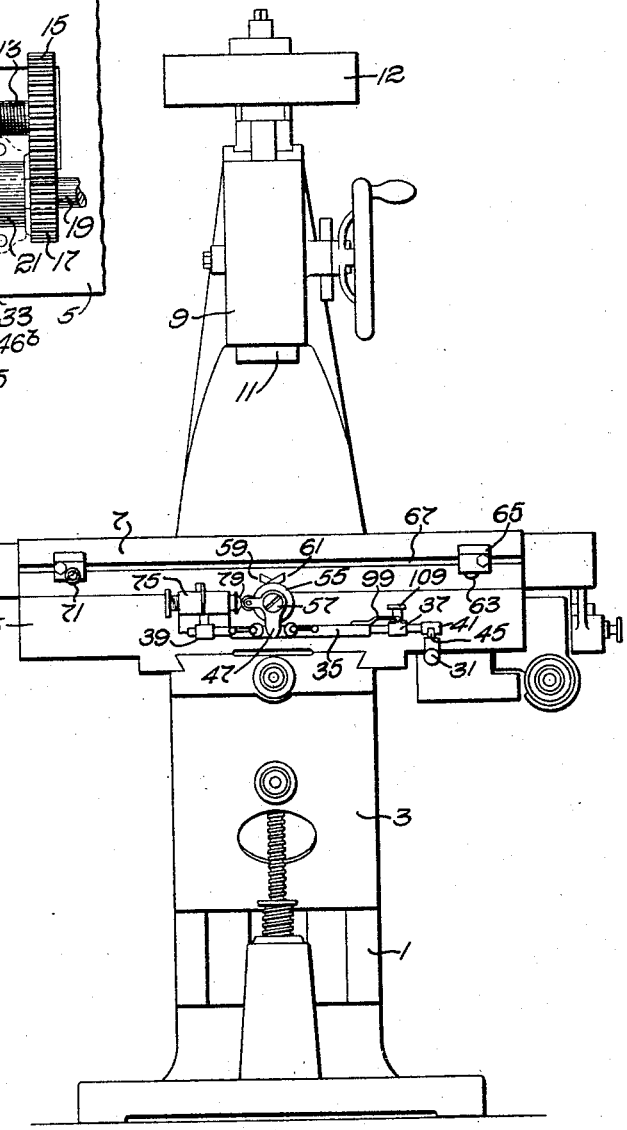
Witnesses:
Horace A. Crossman
Carl L. Choate
Inventor:
John Becker,
by Emery, Booth, Janney & Varney
Attys.

J. BECKER.
FEED REVERSING DEVICE.
APPLICATION FILED APR. 21, 1910.
1,199,337.
Patented Sept. 26, 1916.
2 SHEETS—SHEET 2.
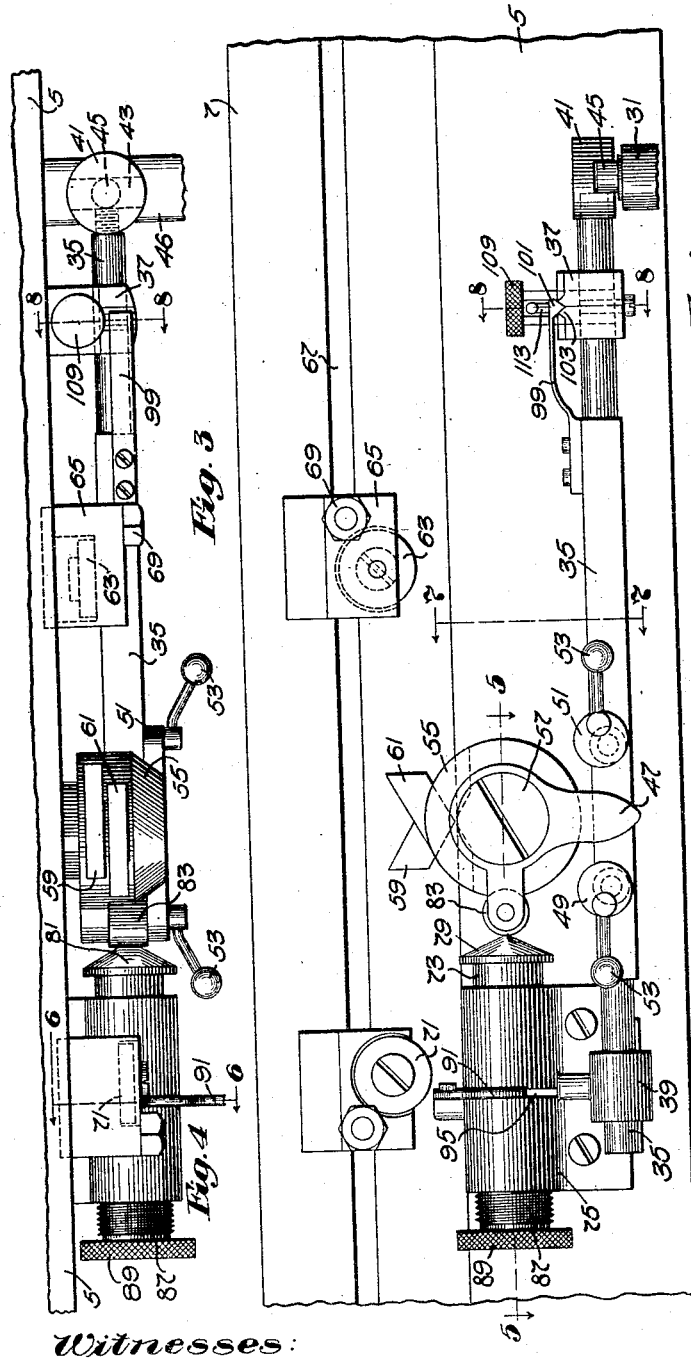
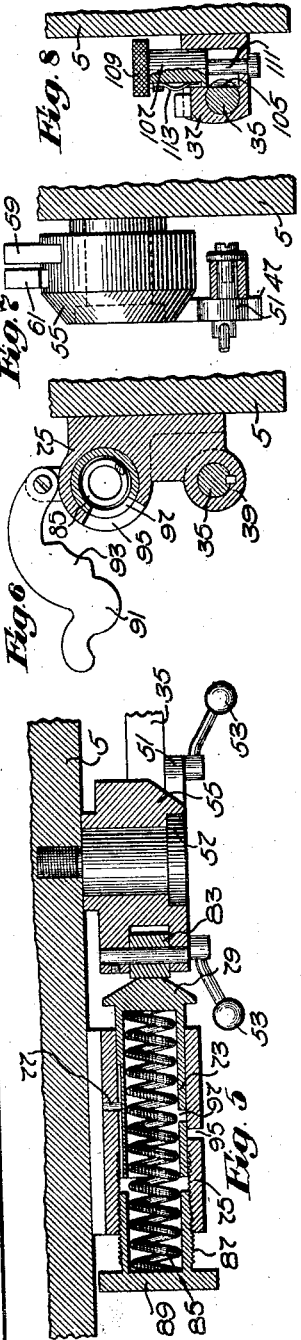
Witnesses:
Horace A. Crossman
Carl L. Choate
Inventor:
John Becker
by Emery, Booth, Janney & Varney
Attys.

UNITED STATES PATENT OFFICE.

JOHN BECKER, OF HYDE PARK, MASSACHUSETTS.

FEED-REVERSING DEVICE.

1,199,337.  Specification of Letters Patent.  Patented Sept. 26, 1916.

Application filed April 21, 1910. Serial No. 556,719.

*To all whom it may concern:*

Be it known that I, JOHN BECKER, a citizen of the United States, and a resident of Hyde Park, in the county of Norfolk and State of Massachusetts, have invented an Improvement in Feed-Reversing Devices, of which the following description, in connection with the accompanying drawings, is a specification, like letters on the drawings representing like parts.

This invention is an improvement in feed reversing devices and for purposes of illustration is shown herein as applied to a vertical milling machine, although it will be understood that it may be readily applied to other uses.

The character of the invention may be best understood by reference to the following description of an illustrative embodiment thereof shown in the accompanying drawings, wherein:

Figure 1 is a front elevation of a vertical milling machine equipped with a feed reversing device embodying my invention; Fig. 2, on an enlarged scale, shows usual driving gears for the work table; Fig. 3, on an enlarged scale, is a front elevation of the feed reversing device shown in Fig. 1; Fig. 4 is a plan of the mechanism shown in Fig. 3; Fig. 5 is a horizontal section taken on line 5—5 of Fig. 3; Fig. 6 is a section taken on line 6—6 of Fig. 4; Fig. 7 is a section taken on line 7—7 of Fig. 3; and Fig. 8 is a section taken on line 8—8 of Fig. 3.

Referring to the drawings, 1 represents a column-like base carrying a vertically adjustable knee 3 supporting a table base 5 carrying a work table 7. Said base 1 extends upwardly curving forwardly to form a bearing 9 receiving a vertical spindle 11 having a pulley 12 which may be driven by a belt in the usual manner.

The table 7 may be fed by a feed screw shaft 13 (Fig. 2) carrying a spur gear 15 driven by a pinion 17 loose on a short countershaft 19 journaled in bearings 21 secured to the work table base 5. The pinion 17 is provided with a hub rotative in the bearing 21 and having at its opposite end a bevel pinion 23. This pinion may be connected to the shaft 19 by a spool clutch 25 splined to the shaft 19 to drive the feed screw shaft 13 from the shaft 19 in one direction. To drive the feed screw shaft 13 in an opposite direction there is provided a bevel pinion 27 loosely mounted on the shaft 19 meshing with an intermediate pinion 29 which also meshes with the bevel pinion 23. When the spool clutch is slid into engagement with the bevel pinion 27 the drive from the shaft 19 will be through the bevel pinion 27, the intermediate pinion 29 and the bevel pinion 23 to the feed screw shaft 13 thereby rotating the latter in an opposite direction. The spool clutch may be shifted to connect one or the other of the bevel pinions 23 and 27 to the shaft 19 by a rocking arm 31 fulcrumed on a pin 33 and having a yoke end received by an annular groove in said spool clutch.

The parts described above may be of usual construction and are described herein as illustrative of a use of my improved feed reversing device which I will now describe.

This feed reversing device is utilized herein to rock the arm 31 and shift the spool clutch as described, and comprises a sliding rod 35 (Fig. 3) having at one end a reduced, rounded portion adapted to slide in a bracket 37 secured to the work table base 5 in any suitable manner. The opposite end of said rod is guided by a bracket 39 secured to said base 5. To detachably connect the rounded end of said rod 35 to the spool clutch controlling arm 31 said rod herein is provided with a head 41 having a transverse groove 43 in the under side thereof adapted to receive a pin 45 projecting upwardly from a handle arm 46 fulcrumed on a pin 46$^a$, said arm 46 being connected to said clutch arm 31 by a pin 46$^b$ on the latter received by a fork 46$^c$ on said handle arm.

In accordance with my invention the rod 35 is moved longitudinally in said guides 37 and 39 to shift the clutch by a rocking tongue 47 adapted to engage one or another of two eccentric lugs 49 and 51 fulcrumed on studs on said rod 35 and adapted to be adjusted by handles 53 for a purpose more fully hereinafter described. The tongue 47 may be fast on or integral with a rocking disk 55 fulcrumed on a large diameter pin 57 having a reduced end threaded into the face of said work table base. To rock said tongue to engage with one or another of said eccentric lugs said disk is provided with a pair of upper, offset, oppositely inclined arms 59 and 61, of hardened steel or other suitable material, which may be integral with or secured to the disk 55 in any suitable manner. The arm 59 is adapted to be engaged by a dog, herein in the form of a roller 63 carried by a block 65 adapted to be slid to various positions of adjustment in a T slot 67 in the face of the work table 7 and be held in its positions of adjustment by a suitable bolt 69. The other arm 61 is adapted to be engaged by a roller 71 similar and similarly mounted to that described, with this exception, that the roller 71 is set farther from the face of the work table in order that it may wipe across the arm 61 without engagement with the arm 59.

It will be apparent that as the work table is fed to the right of Fig. 3 the dog roller 71 will wipe across the back of the arm 61 and rock the disk 55 in a clockwise direction and when the table is traveling in an opposite direction the roller 63 will wipe across the back of the arm 59 and rock the disk 55 in an opposite or contra-clockwise direction. These rocking movements of the disk 55 are utilized to energize means for shifting the rod 35 which I will now describe. This means comprises a plunger 73 adapted to slide longitudinally in a boss bracket 75 secured to the face of the work table base 5, said plunger being prevented from rotative movement therein by a spline 77 (Fig. 5) entered into a longitudinal keyway in said plunger. The plunger is provided with a wedge or substantially conical nose 79 having a flattened face 81 for engagement with a roller 83 carried by the disk 55. The plunger is normally pressed outward into engagement with said roller by a helical spring 85 having one end contained within said plunger and its opposite end contained in a plug 87 threaded into the bracket 75 and provided with a disk handle 89 having a knurled periphery. By turning said handle the plug 87 will be moved in or out of the bracket 75 more or less to vary the tension of the spring 85 as desired.

In operation it may be supposed that the tongue 47 is rocked in a contra-clockwise direction and that the rod 35 is moved to shift the spool clutch to connect the bevel pinion 27 to the shaft 19 and thereby transmit the drive to the feed screw shaft 13 through the intermediate pinion 29 and the pinion 23. The shaft 19 being continuously rotated this will cause the work table, for example, to feed toward the right of Fig. 3. When the tongue disk 55 is thus rocked in a contra-clockwise direction to the position described the disk roller 83 will engage the lower periphery of the cone end of the plunger 73 and the plunger will be pressed outwardly thereto from its bracket by the spring contained therein. After the roller dog 71 has been adjusted on the table to a point where it is desired to change the direction of feed, the table by its travel eventually will cause the roller 71 to engage the back of the arm 61 and rock the disk 55 in a clockwise direction. The initial rocking of the disk 55 in this direction, first will cause the roller 83 to travel from the lower periphery of the cone 79 to the apex or high point thereof and thereby press the plunger into its bracket and compress the spring 85. When the dog roller 71 has subsequently rocked the disk 55 so that the disk roller 83 is slightly beyond the apex of the plunger cone end the rocking of the disk 55 will no longer be effective to press the plunger into its bracket but, on the contrary, said plunger will be released and the spring, energized by the movement of the disk roller 83 to said apex, will suddenly become effective to cause the plunger 73 to spring outward from its bracket with a sudden movement, the upper incline of its cone end pressing against the disk roller 83 and rocking said disk on in a clockwise direction. In other words the tongue disk acts first as a prime mover to energize said plunger and then as a secondary mover under the action of said plunger as a prime mover. This rocking movement of the disk 55 will cause its tongue 47 to engage the eccentric lug 49 and slide the rod 35 to the left of Fig. 3 thereby shifting the spool clutch 25 from engagement with the bevel pinion 23. As a result the direction of rotation of the table feed screw shaft 13 will be reversed and the table will commence to feed to the left of Fig. 3. When said table has traveled a sufficient distance to bring the dog roller 63 into engagement with the other disk arm 59, said roller will wipe across the back of the latter and rock the disk 55 in a contra-clockwise direction, thereby causing the roller 83 to travel from the upper edge of the periphery of the cone end of the plunger 73 down to the apex thereof and as soon as the roller 83 passes beyond said apex the downward incline of the cone end of said plunger will be effective to rock the disk 55 on in a contra-clockwise direction with a sharp, quick movement and cause the disk tongue 47 to engage the eccentric lug 51 and shift the rod 35 to the right of Fig. 3 and again connect the bevel pinion 27 to the shaft 19. It will be apparent that by repeated operations such as described, the direction of feed thus may be automatically indefinitely reversed.

The tongue disk and spring pressed plunger construction described are found to be very effective since, among other reasons, the spring of the plunger not only throws the spool into engagement with one or another of the clutch faces of the pinions 27 and 23 but, also, holds the spool clutch in its clutching position up into engagement with one or another of said bevel pinions until the spool clutch is again shifted to change the direction of travel of the table.

Having described the construction and operation of the mechanism whereby the direction of feed of the table is automatically changed, I will now describe adjustments and means for throwing the clutch into its mid position to stop the feed of the table. To move the spool clutch to this mid position the plunger should be pressed in out of engagement with the disk roller 83 and held in this position. As shown herein this may be effected by a plunger locking arm 91 (Fig. 6) pivoted to the top of the bracket 75 and having a portion 93 adapted to enter slots 95 and 97 extending transversely of said bracket and plunger. It will be apparent that when the plunger is pressed in sufficiently to bring the slots 95 and 97 into registration the portion 93 of the arm 91 may be entered into said slots thereby securely holding the plunger out of engagement with the disk roller 83.

It may be supposed that it is desired to arrest the table at the end of a feed toward the left in Fig. 3. When the roller 63 engages the disk arm 59 the disk will be rocked in a contra-clockwise direction but since the plunger 73 is out of engagement with the disk roller 83 the spring of the plunger will not be energized by said movement and the plunger will not be effective to further rock the disk 55 in a contra-clockwise direction, or, in other words, the rocking of the disk 55 under these conditions is effected merely by the direct engagement of the roller 63 therewith. With the eccentric lug 51 in the position shown in Fig. 3 the engagement of the tongue 47 therewith as occasioned by the rocking of the disk 55 by means of the roller 63 would not be sufficient to throw the spool clutch to its mid position. In order that this movement may be effective to bring said clutch to its mid position the eccentric 51 is turned by its handle 53 about 90° in a contra-clockwise direction. This will in effect adjust the lug longitudinally of the rod 35 toward said tongue and when the disk 55 is rocked by the roller 63 as described, the rocking movement transmitted to said disk then will be sufficient to shift the rod 35 and cause the clutch to arrive at its mid position, out of engagement with either of the bevel pinions 23 and 27, and the rotation of the shaft 19 will be rendered ineffective.

To insure the arrest of the spool clutch in its mid position and prevent any overthrow thereof the rod 35 may be provided with a resilient finger 99 (Fig. 3) having a wedge end 101 adapted to seat itself in a V-shaped depression in an elevation 103 on the top of the rod guide 37 referred to. When the rod 35 is shifted as just described the wedge end of the finger 99 will seat itself into said depression and will thereby hold the spool clutch in its mid position.

In a similar manner if it is desired to arrest the feed of the table at the end of a feed to the right of Fig. 3, the eccentric lug 49 is rocked in a clockwise direction substantially 90° and the clutch will be thrust to its mid position by the engagement of the dog roller 71 with the disk arm 61 in a manner similar to that just described when the table is feeding to the left of Fig. 3.

To prevent accidental engagement of the spool clutch with either of the bevel pinions when the table is not being fed, the rod 35 may be locked to prevent longitudinal movement thereof. To this end the rounded portion of the rod 35 may be provided with a transverse groove 105 (Fig. 8) adapted to receive a thick portion 107 of a lock pin 109. To permit the reciprocation of said rod this pin may be pulled upwardly to bring a reduced end 111 of said pin opposite to said groove 105 said pin being held in its position by a humped spring 113.

In some instances it may be desired to feed the table in one direction, reverse the feed, and then automatically stop the table. For example, sometimes it is desirable to make a fairly heavy cut of substantial depth in the stock, while feeding in one direction, and then make a light finishing cut when feeding in the opposite direction. Under the strain of making the initial heavy cut the tool will be caused to spring more or less, so that when the subsequent feed is made in the opposite direction the tool will spring back to its normal position and will make the light finishing cut without further adjustment.

The feed reversing device described lends itself advantageously to such work since it may be set to feed the table in one direction, automatically reverse the feed, and automatically stop without further attention of the operative other than to start the initial feed.

For example, it may be supposed that it is desired to feed the table toward the left of Fig. 3, reverse the feed to the right of Fig. 3, and then automatically stop at the end of said feed. To effect this series of operations, first the handle 53 of the eccentric lug 49 is turned clockwise through an arc of about ninety degrees, to adjust the lug 49 along the rod 35, to the right of Fig. 3 toward the depending disk tongue 47. Then the clutch shift handle 46 is rocked to the left of Fig. 2. (the direction of desired table feed) to shift the spool 25 and cause the gear 23 to rotate with the shaft 19 and thereby cause the table to commence to travel toward the left of Fig. 3. Eventually the roller dog 63 will engage the disk arm 59 and rock the disk in a contra-clockwise direction, causing the disk roller 83 to pass from the upper edge of the base of the cone end 79 to the apex thereof. This will depress the plunger 73 against the resistance of its spring, until the disk 55 is rocked sufficiently to bring its roller 83 beyond the apex of the cone end 79 of said plunger, whereupon the previously energized plunger spring will discharge and project toward said disk 55, and cause the roller 83 of the latter to pass from the apex of the cone end 79 toward the lower edge of the base of said cone end. This will further rock the disk 55 and cause its tongue 47 to engage the eccentric lug 51, shift the rod 35 to the right of Fig. 3, and cause the spool clutch 25 to disengage from the gear 23 and engage the gear 27. This will reverse the feed of the table and cause the latter to commence to travel to the right of Fig. 3. This travel will eventually bring the roller dog 71 into engagement with the disk arm 61 and will rock the disk 55 in a clockwise direction, causing the disk roller 83 to pass from the lower edge of the base of the cone end 79 to the apex thereof. The previous sliding of the rod 35 to the right on the reversing of the feed, and the previous adjustment of the eccentric lug 49 along said rod to the right thereof, brought said lug to a point adjacent the depending tongue 47 of the disk 55. As a result, the rocking of said tongue on the passing of the disk roller 83 from the lower edge of the base of the cone end 79 to the apex thereof caused said tongue to engage said eccentric lug 49 and move the latter to shift the rod 35 to the left of Fig. 3, and move the clutch spool to its mid position out of engagement with either of the bevel gears 23 or 27 and as a result arrest the feed of the table. The disk 55 will be prevented from over-rocking and throwing the clutch spool beyond its mid-position by the seating of the wedge end 101 of the spring finger 99 into the V depression in the elevation 103 of the rod guide 37, and the seating of the disk roller 83 in the slight depression on the apex of the cone end 79.

When the table has completed its travel to the left of Fig. 3, the tongue 47 has rocked to the right into engagement with the eccentric 51 and remains in this position until on the return travel of the table to the right of Fig. 3, the roller 71 engages the arm 61. Thus the tongue is a sufficient distance from the eccentric 49 to allow the roller 83 to pass from the lower edge to the apex of the plunger 79, without going beyond said apex. Of course the roller 71 does not move beyond the arm 61 in this operation.

Any number of reverse cuts and arrests, such as just described, may be made without any other adjustment of the device than the shifting of the handle 46 to the left to start the initial feed.

In a similar manner, by setting the eccentric lug 51 to the left of Fig. 3 and shifting the clutch handle 46 to the right of said figure (the direction of desired table feed), the table may be fed to the right of Fig. 3, be automatically reversed, and automatically stopped.

While one embodiment of the invention has been selected for purposes of illustrating the invention, it will be understood that various modifications may be made without departing from the scope of the claims.

What I claim as new and desire to secure by Letters Patent is:—

1. A device of the class described comprising, in combination, a work support; a rocking member having oppositely inclined arms projecting therefrom; dogs carried by said support and adapted to engage said arms; a feed shift rod; and a spring pressed plunger adapted to be energized by the rocking of said member to shift said rod.

2. A device of the class described comprising, in combination, a work table; a feed shaft therefor; gears loose on the latter; a shift clutch for connecting one or the other of said gears to said shaft; a rod connected to said clutch; spaced lugs on said rod; a rocking member for engagement with one or another of said lugs to shift said rod; a spring pressed plunger engaging said member; projections on said member; and dogs on said table for rocking said member in opposite directions to energize said plunger and cause the latter to rock said member to shift said clutch.

3. A feed reversing device comprising, in combination, a work support; feeding means therefor; a spring pressed plunger; a rod having lugs thereon; and a member moved by travel of said support to energize said plunger and then engage one or another of said lugs and shift said rod to reverse said feeding means.

4. A feed reversing device comprising, in combination, a work table; a shaft; oppositely rotative feeding gears loose thereon; a clutch for connecting one or another of said gears to said shaft; clutch actuating means, a rocking member; dogs on said table for rocking said member on movements of said table; and eccentrics on said means for varying the throw of said clutch.

5. A feed reversing device comprising, in combination, a work table; a base therefor; adjustable dogs on said table; feeding devices for said table; a rocking tongue disk pivoted on said table base; a rod adapted to be slid in opposite directions by the engagement of the tongue of said disk therewith; a roller carried by said disk; a spring pressed plunger having a wedge end for engagement with said roller, said plunger being adapted to be pressed against the resistance of its spring on the travel of said disk roller on one incline of said wedge and adapted to be effective to rock said disk, when said roller passes the high point of said wedge, to slide said rod to actuate said feeding device and change the direction of feed of said table.

6. A feed reversing device comprising, in combination, a bed; a work table thereon; means for feeding said table relatively to said bed; a spring pressed plunger and a rocking member both mounted on said bed; a feed reversing clutch, said plunger and rocking member coöperating on rocking of said member by said table to shift said clutch and reverse the feed and locking means for preventing said plunger from coöperating with said rocking member.

7. A feed reversing device comprising, in combination, a support; feeding means therefor, including a shaft and gears oppositely rotative thereon; a clutch for connecting one or the other of said gears to said shaft; a spring pressed plunger having a tapered end; a rocking member formed to slide over said end, said member being rocked by the travel of said support in one direction to and beyond the apex of said end to energize said plunger and permit the latter further to rock said member and shift said clutch from one of said gears to the other to reverse the feed; and means for automatically stopping said rocking member at the apex of said plunger on the feed of the support in an opposite direction to shift said clutch out of engagement with said gears and thereby arrest the feed of said support.

8. A feed reversing device comprising, in combination, a support; feeding means therefor, including a shaft and gears oppositely rotative thereon; a clutch for connecting one or the other of said gears to said shaft; a spring pressed plunger having a tapered end; means adapted to pass over oppositely inclined surfaces of said tapered end, said means being movable over both of said surfaces on the feed of said support in one direction to shift said clutch from one of said gears to the other, and said means being adapted to pass over but one of said surfaces to shift the clutch into a neutral position out of engagement with both of said gears to arrest said support on the completion of its feed in an opposite direction.

9. A feed reversing device comprising, in combination, a support; feeding means therefor including a shaft and gears oppositely rotative thereon; a clutch for connecting one or the other of said gears to said shaft; a spring pressed plunger having a tapered end presenting opposed inclined surfaces; and a rocking member having a portion formed to ride over said surfaces, said member being rocked by the travel of said support over said apex on the travel of said support in one direction to shift said clutch to reverse the feed, and said member being rocked to said apex on a subsequent feed of said support in an opposite direction to shift said clutch to a position out of engagement with both of said gears and thereby automatically arrest the feed.

10. A feed reversing device comprising, in combination, a support; feeding means therefor including a feed reversing clutch; and means for shifting said clutch comprising a member moved by said support on the travel of the latter in one direction to reverse the feed thereof; and adjustable means adapted to be set at will to automatically limit the movement of said member and permit the latter to shift said clutch to a position to automatically arrest the feed of said support on the completion of the feed of the latter in an opposite direction, or be set to automatically reverse the feed.

11. A feed reversing device comprising, in combination, a support; a base therefor; feeding means for said support; and controlling means for said feeding means comprising a member pivotally mounted in said base; a spring pressed plunger adapted to be energized on the rocking of said member; and adjustable means adapted to be set to permit said plunger to be energized and discharged by said member on the travel of said support in one direction to reverse the feed, said adjustable means being adapted to be set to automatically arrest said member in a position to energize but prevent discharge of said plunger on the travel of said table in an opposite direction to arrest the feed of said table, or be set to automatically reverse the feed.

12. A feed reversing device comprising, in combination, a bed; a table thereon; dogs on said table; a member pivoted on said bed and adapted to be rocked by the engagement of one or the other of said dogs therewith; a spring pressed plunger mounted on said bed adjacent said member, said plunger having a tapered end adapted to be engaged by said member; a rod having lugs thereon adapted to be engaged by said member; a clutch adapted to be shifted by said rod; a shaft and oppositely rotative gears thereon adapted to be connected by said clutch to said shaft to reverse the feed of said table.

13. A feed reversing device comprising, in combination, a bed; a table thereon; a shaft; oppositely rotative gears on said shaft; a clutch for connecting one or the other of said gears to said shaft; and controlling means for shifting said clutch comprising a rod having lugs thereon, a rocking member pivoted to said bed and having a tongue projecting between said lugs; a spring pressed plunger mounted on said bed and dogs on said table for alternate engagement with said member whereby to rock the latter, energize said plunger and permit the latter to discharge and further rock said member, slide said rod and shift said clutch to reverse the feed.

14. A device of the class described comprising, in combination, a support; means for feeding the same in opposite directions, and controlling means for said feeding means having automatic means for arresting said support after the latter has been fed in either direction and in a reverse direction.

15. A device of the class described comprising, in combination, a support; means for feeding the same in opposite directions; and controlling means for said feeding means including a spring pressed plunger and means caused by said support to wipe over the end of said plunger to energize the same, said means being adapted to then be actuated by said plunger to reverse the feed of said support, and means to maintain said plunger in its energized position whereby the feed is automatically arrested.

16. A device of the class described comprising, in combination, a support; means for feeding the same in opposite directions; and controlling means for said feeding means including an element moved by said support in the course of travel of the latter, and means actuated by said element for reversing the feed when in one position and adapted to be adjusted to a position to automatically arrest the feed when actuated by said element.

17. A device of the class described comprising, in combination, a support; means for feeding the same in opposite directions and controlling means for said feeding means including a rod; spaced, adjustable means on said rod, and actuating means interposed between said adjustable means and adapted to be moved by said support to engage one or another of said adjustable means and shift said rod to reverse the feed, said adjustable means being adapted to be set in positions to cause said rod to be moved to arrest the feed.

18. A device of the class described comprising, in combination, a support; dogs thereon; feeding means for said support, and controlling means for said feeding means comprising a clutch and means intermediate said dogs and said clutch and adapted to be engaged by said dogs for shifting said clutch, said intermediate means being constructed and arranged to permit said dogs to pass the same after being moved thereby.

19. A device of the class described comprising, in combination, a support; dogs thereon; feeding means for said support, and controlling means for said feeding means comprising a shiftable clutch, and a rocking member engaged by said dogs to shift said clutch, said rocking member being adapted to permit said dogs to wipe past the same after being actuated thereby.

20. A device of the class described comprising, in combination, a bed; a table thereon; dogs on said table; feeding means for said table; and controlling means for said feeding means comprising a clutch, a spring pressed plunger mounted on said bed and having a tapered end, a rocking member having a portion adapted to move over said tapered end, said member having a pair of arms, one or another of the latter being adapted to be engaged by said dogs to rock said member to energize said plunger and then render said plunger effective to further rock said member and shift said clutch to reverse the feed.

21. A feed reversing device comprising, in combination, a bed 5; a table 7 thereon; dogs 63 and 71 on said table; a feed screw 13 for said table; a clutch; means controlled thereby for changing the direction of rotation of said screw; a rod 35 connected to said clutch and mounted to slide on said bed; lugs 49 and 51 on said rod; a member 55 pivoted on said bed and having a tongue 47 projecting between said lugs; arms 59 and 61 on said member adapted to be engaged by said dogs and a spring pressed plunger 73 coöperating with said member 55 for shifting said clutch to control the feed.

22. A feed reversing device comprising in combination, a rocking member with provision for operating the same by movement of a table; a clutch shifting member actuated by said rocking member and having elements thereon adjustable to different positions for reversing or arresting the feed; and means for assisting the operation of said rocking member.

23. A feed reversing device comprising, in combination, a clutch shifting member, a rocking member having provision for pivotal connection with a table base for transmitting movement from the table to said clutch shifting member on the engagement of table feed dogs therewith, and means coöperating with said transmitting member for arresting or allowing continuation of the movement thereof.

In testimony whereof, I have signed my name to this specification, in the presence of two subscribing witnesses.

JOHN BECKER.

Witnesses:
HENRY T. WILLIAMS,
ROBERT H. KAMMLER.